July 5, 1960 W. SMITH 2,943,418
REVERSING MECHANISM FOR TOY CARS
Filed May 26, 1958
FIG. 1
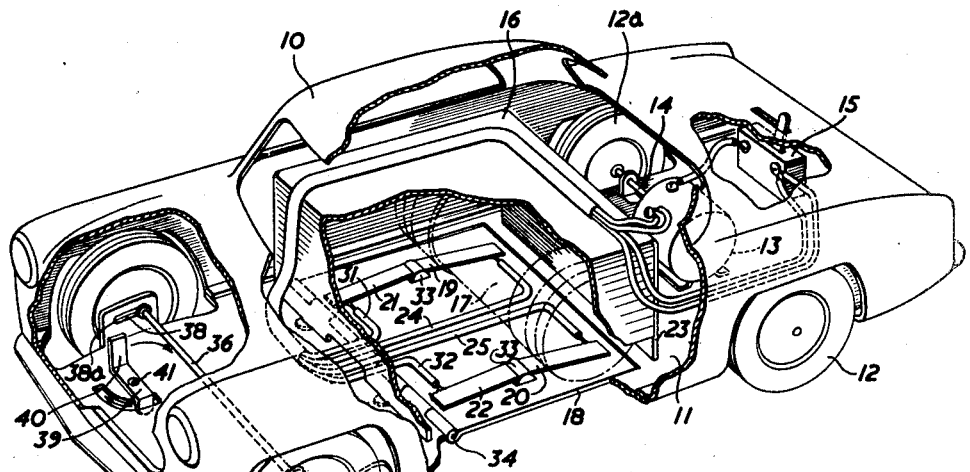
FIG. 2
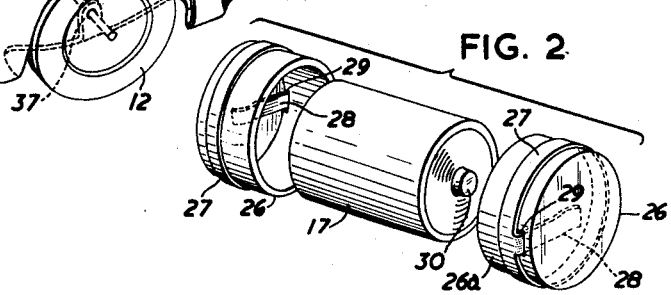
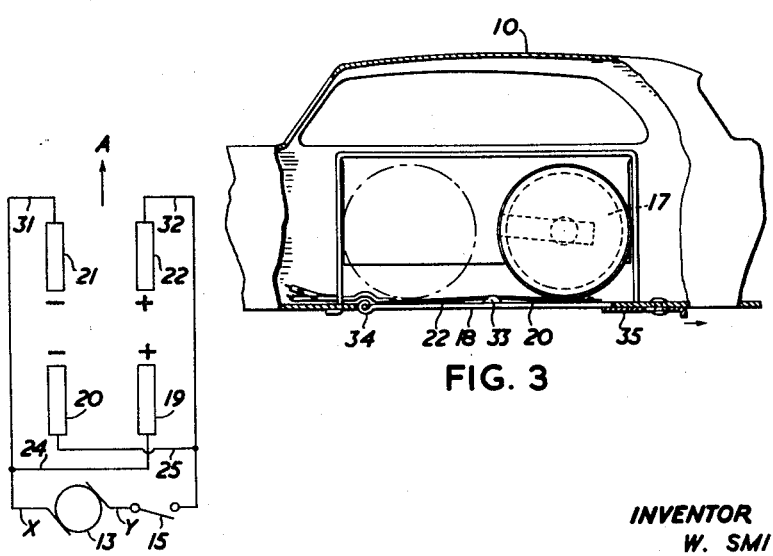
FIG. 3
FIG. 4
INVENTOR
W. SMITH
BY: Maybee & Legris
ATTORNEYS

United States Patent Office 2,943,418
Patented July 5, 1960

2,943,418

REVERSING MECHANISM FOR TOY CARS

Walter Smith, 27 Homewood Ave., Toronto,
Ontario, Canada

Filed May 26, 1958, Ser. No. 737,899

4 Claims. (Cl. 46—244)

This invention relates to toy vehicles and, in particular, to an inertia operated reversing mechanism for toy vehicles which are driven by dry cell battery powered electric motors.

It is an object of the present invention to provide a simple, cheap, efficient means for reversing the driving motor of an electrically operated toy vehicle when the vehicle meets with an obstruction in its path.

The invention is embodied in an inertia operated mechanism whereby the polarity of the dry cell battery powering the electric motor is reversed when the vehicle suddenly decelerates due to its having struck an obstruction.

The nature of the invention and the advantages to be obtained therefrom will become evident from the following description of a preferred embodiment when read in conjunction with the accompanying drawings in which:

Figure 1 is a perspective view, partly cut away, showing a toy vehicle fitted with the invention;

Figure 2 is an exploded perspective view of a dry cell battery adapted for use with the vehicle of Figure 1;

Figure 3 is a side elevation view taken in section of the battery containing the chamber of the vehicle in Figure 1, and Figure 4 is a schematic diagram of the electrical circuit.

Referring now to Figure 1 it will be seen that the toy vehicle is of predominantly conventional construction being formed of a sheet metal stamping and comprising a body 10, the body having a floor 11, and being rollable upon wheels 12.

A direct current electric driving motor 13 is provided in the vehicle and may transmit its power to rear wheel 12a by means of a shaft 14 although other commonly used power transmission mechanisms may be employed. The electric motor 13 is connected in series with a single pole, single throw "on-off" switch 15.

Within the body 10 and conveniently located substantially midway between the front and rear wheels is a chamber 16 which is adapted to receive a cylindrical dry cell battery 17, the longitudinal axis of the battery being horizontal and normal to the longitudinal axis of the body 10. The chamber 16 is slightly wider than the length of the dry cell battery 17 and slightly higher than the battery and is of a length which is slightly greater than twice the diameter of the dry cell battery 17. Access to the chamber 16 may be had through a door 18 which, when in the closed position as shown in Figure 1, constitutes the floor of the chamber. Secured to the floor of the chamber and electrically insulated therefrom are four metallic strips 19, 20, 21 and 22. Strips 19 and 20 are located adjacent the rear wall 23 of the chamber 16 and these strips are connected in series with the driving motor 13 by means of electrical conduits 24 and 25. When the dry cell battery 17 is in the position shown in Figure 1 the battery will drive the direct current electric motor 13 in a direction such that the vehicle will move in a forward direction, provided the switch 15 is in the "on" position. Electrical contact between the strips 19 and 20 and the terminals of the battery 17 is achieved by means of the structure shown in Figure 2. In Figure 2 the battery 17 is shown as being provided, at either end, with a cap 26 each of which is provided, on its external surface, with a metallic band 27, each band 27 having a lug 28 which passes through the side wall 26a of the cap through an aperture 29 and thence extends radially inwardly of the cap on the inside surface of the cap to lie in a position where it may contact the electrical terminal of the battery such as the positive terminal 30 shown in Figure 2. When the caps 26 are fitted over the end of the battery as shown in dotted lines in Figure 1 the distance between the metallic bands 27 surrounding the caps 26 will be equal to the distance separating the strips 19 and 20 and strips 21 and 22. Thus, when the battery 17 lies within the chamber 16 upon the door 18 (when the door is closed) electrical contact will be made between the strips 19 and 20 and the electrical terminals of the battery 17.

A second pair of metallic strips 21 and 22 is also provided on the door 18 of the chamber 16 and these strips are electrically insulated from both the door 18 and from strips 19 and 20. The polarity of strips 21 and 22 with respect to the motor 13 is reversed from that of strips 19 and 20 as may readily be seen in Figure 4. Strips 21 and 22 are connected to the electric motor by means of conduits 31 and 32 seen in both Figures 1 and 4 and from a consideration of Figure 4 the reversing of polarity may be readily observed. When the battery 17 is lying upon strips 19 and 20 the positive terminal of the battery will be connected to the motor through motor terminal X and the negative terminal of the battery will be connected to the motor through motor terminal Y. When the battery lies upon metallic strips 21 and 22, however, the positive terminal of the battery will be connected to the motor through motor terminal Y and the negative terminal of the battery will be connected to the motor through motor terminal X. Accordingly the direct current driving motor 13 will run in one direction when the battery rests upon strips 19 and 20 and in the opposite direction when the battery rests upon strips 21 and 22.

The adjacent ends of strips 21 and 22 and strips 19 and 20 are raised slightly from the floor 18 of the chamber 16 by means of insulating blocks 33. Insulating blocks 33, in effect, provide a raised ridge running across the floor of the chamber 16 lying in a direction normal to the longitudinal axis of the body 10. The purpose of this raised ridge is to lightly restrain the battery 17 against movement between its two positions. This may be readily observed with reference to Figure 3 where the battery 17 is shown in what is termed its first position wherein, as described above, it will drive the vehicle in the forward direction. The battery, in this position, is adjacent the rear of the body 10 and, is lightly restrained in this position due to the fact that in order to move to the position adjacent the front of the body it must roll over the ridge provided by the blocks 33. The door 18, as seen in Figures 1 and 3 is provided with a hinge 34 about which it may pivot to enable the battery 17 to be placed in and removed from the chamber 16. A suitable catch 35 is provided on the side of the door 18 remote from the hinge 34 to secure the door in the closed position.

Having now described the structure of the invention, the mode of operation will be explained.

Let it be assumed, for the moment, that the battery 17 is placed in the vehicle in the position shown in Figure 1 and the switch 15 is moved to the "on" position. The current from the battery will then flow through conduits 24 and 25 to the motor 13 through the switch 15 and the vehicle will be driven in the forward direction due to the fact that power from the motor 13 is transmitted to driving wheel 12a through the shaft 14. If the vehicle now encounters an obstacle in its path it will be suddenly decelerated to a complete stop, but the battery 17 which is free to roll within the chamber 16 will, due to its inertia, move quickly from the position shown in Figure 1 resting upon strips 19 and 20 to its second position adjacent the front of the chamber 16 where it will rest upon strips 21 and 22 and, accordingly, it will be electrically connected in series with the motor 13 with its polarity reversed so that the motor 13 will now transmit power to driving wheel 12a to drive the vehicle in reverse. Accordingly, the vehicle will immediately back away from the obstruction which it has encountered and will continue in the reverse direction until, travelling in that direction, it encounters an obstruction which will decelerate it at a rate sufficient to cause the battery 17 to move from the second position back to the first position shown in Figure 1. This cycle will continue until the switch 15 is turned to the "off" position or until the battery runs down.

In order to enhance the operation of the vehicle as a toy the front wheels 12 are mounted upon a solid axle 36 which is journalled for rotation in a bearing 37, at one end, and, at the other end, is journalled for rotation in a slot 38 which enables the axle 36 to be angularly displaced relative to the longitudinal axis of the body 10 about a pivot point in the centre of bearing 37. It will be seen, accordingly, that when the vehicle is moving in the forward direction the axle will tend to occupy the position shown in Figure 1. When, however, the vehicle is moving in the reverse direction the frictional forces acting upon the front wheels will tend to move the axle 36 from the position shown in Figure 1 to a position wherein it is riding against the end 38a of the slot 38. In this position, of course, the vehicle will no longer travel in a straight line but will travel in a curve. Accordingly, when the vehicle is in use it will not merely cycle back and forth in a straight line between two obstructions but will travel more or less erratically about the surface upon which it is placed and will, in some instances, strike an obstruction and, on the next trip in the same direction will, in all probability, miss the same obstruction and reverse itself only upon contact with a different obstruction. Accordingly, the vehicle will travel about the surface upon which it is operated in a manner which is much more realistic, from the point of view of a child playing with the vehicle than if the movable front axle were not provided.

In the event that it is desired for the vehicle to travel in a straight line means are provided to lock the axle 36 in the position shown in Figure 1; these means involve a pivotable stop member 39 comprising a strip of metal having an abutment 40 which, by pivoting member 39 about point 41 may be caused to lightly bear against the axle 36 to prevent it from moving out of the position shown in Figure 1.

Having described the invention in detail with reference to one preferred embodiment it is desired to point out that the description of the embodiment is intended to be illustrative of the inventive principle rather than limiting, the scope of the invention being defined in the appended claims.

What I claim as my invention is:

1. In a toy vehicle having a body, a direct current electric driving motor and a single pole, single throw electric switch connected in series with the motor, a chamber in the body adapted to receive a cylindrical dry cell battery with its longitudinal axis normal to the longitudinal axis of the body, the battery having annular contacts axially spaced along its cylindrical surface, said contacts being electrically connected to the terminals of the battery, the battery being rollable in the chamber from a first position adjacent the rear of the body to a second position adjacent the front of the body in the first position its two annular contacts engaging a first pair of contacts in the floor of the chamber and being thereby electrically connected in series with the electric motor to drive the vehicle forwardly, and in the second position adjacent the front of the body, its two annular contacts engaging a second pair of contacts in the floor of the chamber and being thereby connected in series with the electric motor with its polarity reversed from that of the first position to drive the vehicle in reverse.

2. A toy vehicle as claimed in claim 1 in which the chamber in the body is provided with a floor upon which the cylindrical dry cell battery rests, the floor having a raised ridge extending across its width in a direction normal to the longitudinal axis of the body so that the battery will be lightly restrained from movement between its two positions.

3. A toy vehicle as claimed in claim 1 in which the chamber is provided with four metallic strips, two strips associated with each of the two positions of the dry cell battery, two of the strips being arranged to contact the terminals of the battery when in its first position and the other two strips being arranged to contact the terminals of the battery when in the second of its two positions.

4. In a toy vehicle having a body, a direct current electric driving motor and a single pole, single throw switch connected in series with the motor, a chamber in the body adapted to receive a cylindrical dry cell battery with its longitudinal axis normal to the longitudinal axis of the body, the direct current battery having annular contacts axially spaced along its cylindrical surface, said contacts being electrically connected to the terminals of the battery, the battery being rollable in the chamber from a first position adjacent the rear of the body to a second position adjacent the front of the body; in the first position its two annular contacts engaging with two metallic strips lying on and insulated from the floor of the chamber, the metallic strips being connected in series with the electric driving motor so that the battery will drive the vehicle forwardly; in the second position the two two annular contacts on the cylindrical surface of the battery being in contact with two metallic strips lying on and insulated from the floor of the chamber so that the battery is connected in series with the electric motor with its polarity reversed from that of the first position to drive the vehicle in reverse, the floor of the vehicle being provided with a raised ridge extending across its width in a directional normal to the longitudinal axis of the vehicle so that the battery will be lightly restrained from moving between its two positions.

References Cited in the file of this patent

UNITED STATES PATENTS

| | | |
|---|---|---|
| 2,683,956 | Conte | July 20, 1954 |
| 2,846,814 | Lettieri | Aug. 12, 1958 |